(12) United States Patent
Ruzewski et al.

(10) Patent No.: US 7,232,134 B2
(45) Date of Patent: Jun. 19, 2007

(54) STEERING SKI FOR SNOW VEHICLE

(75) Inventors: Ronald Ruzewski, Minocqua, WI (US);
Jeremy Fohrenkam, Minocqua, WI
(US); Kiyoteru Suzuki, Iwata (JP);
Takahiko Kubota, Iwata (JP)

(73) Assignees: Yamaha Motor Corporation, U.S.A.,
Cypress, CA (US); **Yamaha Hatsudoki
Kabushiki Kaisha**, Shizuoka-ken (JP)

( * ) Notice: Subject to any disclaimer, the term of this patent is extended or adjusted under 35 U.S.C. 154(b) by 158 days.

(21) Appl. No.: 10/772,779

(22) Filed: Feb. 5, 2004

(65) Prior Publication Data

US 2005/0173873 A1 Aug. 11, 2005

(51) Int. Cl.
*B62B 17/02* (2006.01)

(52) U.S. Cl. .......................................... 280/28; 180/182
(58) Field of Classification Search ................. 280/15, 280/16, 17, 21.1, 28, 28.14; 180/182
See application file for complete search history.

(56) References Cited

U.S. PATENT DOCUMENTS

| | | | |
|---|---|---|---|
| 1,087,745 A | 2/1914 | Ellis | |
| 2,593,025 A | 4/1952 | Hanson et al. | |
| 3,395,411 A | 8/1968 | Pope et al. | |
| 3,605,926 A | 9/1971 | Leonawicz | |
| 3,643,979 A * | 2/1972 | Richards | 280/28 |
| 3,675,939 A | 7/1972 | Vik | 280/28 |
| 3,718,341 A | 2/1973 | Westberg | |
| 3,732,939 A | 5/1973 | Samson | |
| 3,817,544 A | 6/1974 | Labelle | |
| 3,856,318 A | 12/1974 | Hollenbeck | |
| 3,871,675 A | 3/1975 | Lund | |
| 3,884,314 A | 5/1975 | Callaway | 180/9.54 |
| 4,077,639 A | 3/1978 | Reedy | |
| 4,083,577 A | 4/1978 | Ford | |
| 4,262,927 A | 4/1981 | Hochstrasser | |
| 4,434,867 A | 3/1984 | Grinde | 180/190 |
| 4,491,333 A | 1/1985 | Warnke | 280/28 |
| 4,509,771 A | 4/1985 | Nussbaumer | |
| 4,524,984 A | 6/1985 | Axelson | |
| 4,804,198 A | 2/1989 | Imai et al. | 280/21.1 |
| 4,815,759 A | 3/1989 | Imai et al. | 280/21.1 |
| 4,826,201 A | 5/1989 | Varan et al. | 280/609 |

(Continued)

FOREIGN PATENT DOCUMENTS

CA 211 322 5/1921

(Continued)

*Primary Examiner*—Jeff Restifo
(74) *Attorney, Agent, or Firm*—Knobbe, Martens, Olson & Bear, LLP

(57) ABSTRACT

A snowmobile has a pair of steering skis. Each ski has an elongated primary section that has a bottom surface. The bottom surface extends generally horizontally and warps upward at a forwardly end. A keel section extends along the primary section. The keel section projects downwardly from the primary section. A pair of generally vertical sections extends along the primary section. Each generally vertical section has a generally vertical surface that extends upwardly from a side edge of the bottom surface of the primary section. In one embodiment, a pair of generally horizontal sections extends along the primary section. Each horizontal section has a generally horizontal surface that extends generally horizontally outward from a top end of the generally vertical surface of each generally vertical section.

27 Claims, 11 Drawing Sheets

U.S. PATENT DOCUMENTS

| | | | | |
|---|---|---|---|---|
| 4,919,441 | A | 4/1990 | Marier et al. | 280/21.1 |
| 4,974,868 | A | 12/1990 | Morris | |
| 5,033,572 | A | 7/1991 | Zulawski | 180/190 |
| 5,040,818 | A | 8/1991 | Metheny | 280/609 |
| 5,108,124 | A | 4/1992 | Pascal et al. | 280/609 |
| 5,145,195 | A * | 9/1992 | Campbell et al. | 280/28 |
| 5,145,201 | A | 9/1992 | Metheny et al. | |
| 5,165,709 | A | 11/1992 | Jacques | 280/28 |
| 5,222,749 | A | 6/1993 | Bergstrom | |
| 5,251,718 | A | 10/1993 | Inagawa et al. | 180/190 |
| 5,340,144 | A | 8/1994 | Eleneke | 280/609 |
| 5,344,168 | A | 9/1994 | Olson et al. | 280/28 |
| 5,443,278 | A | 8/1995 | Berto | 280/28 |
| 5,462,304 | A | 10/1995 | Nyman | |
| D366,014 | S | 1/1996 | Lindquist et al. | |
| D367,018 | S | 2/1996 | Bernat | |
| 5,586,614 | A | 12/1996 | Kouchi et al. | |
| 5,599,030 | A | 2/1997 | Campbell et al. | 280/28 |
| 5,700,020 | A | 12/1997 | Noble | 280/28 |
| 5,829,545 | A | 11/1998 | Yamamoto et al. | |
| 5,836,594 | A | 11/1998 | Simmons | |
| D408,759 | S | 4/1999 | Chapdelaine | |
| 5,964,311 | A | 10/1999 | Yamamoto et al. | |
| 6,009,966 | A | 1/2000 | Olson et al. | 180/182 |
| 6,012,728 | A | 1/2000 | Noble | 180/182 |
| 6,102,413 | A | 8/2000 | Khennache et al. | |
| 6,105,979 | A | 8/2000 | Desrochers | |
| 6,267,392 | B1 | 7/2001 | Noble | |
| 6,276,699 | B1 * | 8/2001 | Simmons et al. | 280/28 |
| 6,331,008 | B2 | 12/2001 | Cormican | |
| 6,378,889 | B1 | 4/2002 | Moriyama et al. | 280/609 |
| 6,431,561 | B1 * | 8/2002 | Hedlund | 280/28 |
| D469,036 | S | 1/2003 | Bruns et al. | |
| 6,513,612 | B2 | 2/2003 | Moriyama | |
| 6,520,512 | B1 | 2/2003 | Lachance | |
| 6,626,444 | B2 * | 9/2003 | Noble | 280/28 |
| 6,631,912 | B2 * | 10/2003 | Metheny | 280/28 |
| D484,072 | S * | 12/2003 | Bruns | D12/7 |
| 6,692,009 | B2 * | 2/2004 | Lemieux | 280/28 |
| 6,764,635 | B2 | 7/2004 | Cormican | |
| 6,955,236 | B2 * | 10/2005 | Roberts et al. | 180/182 |
| 6,991,056 | B2 | 1/2006 | Roberts et al. | |
| 2001/0032744 | A1 | 10/2001 | Moriyama | |
| 2002/0038940 | A1 | 4/2002 | Cormican | 280/22 |
| 2002/0105166 | A1 | 8/2002 | Lemieux | |
| 2002/0129982 | A1 | 9/2002 | Harle et al. | |
| 2003/0024751 | A1 | 2/2003 | Lebreux | |
| 2003/0034619 | A1 | 2/2003 | Bergstrom | |
| 2003/0234500 | A1 * | 12/2003 | Roberts et al. | 280/28 |

FOREIGN PATENT DOCUMENTS

| | | |
|---|---|---|
| CA | 232 374 | 7/1923 |
| CA | 253 557 | 9/1925 |
| CA | 423 594 | 11/1944 |
| CA | 517 048 | 10/1955 |
| CA | 650 881 | 10/1962 |
| CA | 897 747 | 4/1972 |
| CA | 898310 | 4/1972 |
| CA | 916 204 | 12/1972 |
| CA | 936 197 | 10/1973 |
| CA | 954566 | 9/1974 |
| CA | 955292 | 9/1974 |
| CA | 960 729 | 1/1975 |
| CA | 966 172 | 4/1975 |
| CA | 967 626 | 5/1975 |
| CA | 977391 | 11/1975 |
| CA | 981 314 | 1/1976 |
| CA | 983 072 | 2/1976 |
| CA | 987707 | 4/1976 |
| CA | 991 685 | 6/1976 |
| CA | 1 008 111 | 4/1977 |
| CA | 1 020 989 | 11/1977 |
| CA | 1 059 173 | 7/1979 |
| CA | 2018591 | 6/1990 |
| CA | 2 023 228 | 8/1990 |
| CA | 1 288 789 | 9/1991 |
| CA | 2 109 241 | 10/1993 |
| CA | 2108537 | 10/1993 |
| CA | 2295166 | 1/1997 |
| CA | 2 197 618 | 2/1997 |
| CA | 2 217 279 | 10/1997 |
| CA | 2 195 166 | 7/1998 |
| CA | 2244520 | 7/1998 |
| CA | 2 103 849 | 10/1999 |
| CA | 2 244 520 | 1/2000 |
| CA | 2 304 411 | 4/2000 |
| CA | 2 329 578 | 10/2001 |
| CA | 2 018 591 | 11/2001 |
| CA | 2 378 638 | 4/2002 |
| CA | 2 191 385 | 3/2005 |
| DE | 1132474 | 3/1958 |
| JP | 2000/289684 | 10/2000 |
| WO | WO 00/61431 | 4/2000 |

* cited by examiner

STEERING SKI FOR SNOW VEHICLE

BACKGROUND OF THE INVENTION

1. Field of the Invention

The present invention generally relates to skis for snow vehicles. More particularly, the present invention relates to steering skis that provide improved handling for such vehicles.

2. Description of the Related Art

The use of snowmobiles and similar snow vehicles has increased in popularity in recent years. These vehicles are being used both for utilitarian purposes and for sport and recreational purposes. The vehicles typically are adapted to travel across snow and/or ice and usually include at least one forward facing ski along with a driven belt track or other propulsion mechanism, e.g., wheels.

Snowmobiles are controlled through the use of weight shifting and steering movement of the skis. Snowmobile skis typically have an elongated section that forms a primary bottom surface, which contacts the snow, and a keel that is positioned along the bottom surface to inhibit the ski from skidding.

Snowmobile skies can have a pair of flares on both sides of the elongated section to prevent the snowmobile ski from being buried under relatively soft snow. The flares are upturned at angles in the range between 30° and 60° from the horizontal ground (i.e., equal to or more than 120° from the bottom surface of the elongated section). The flares also provide good maneuverability such that the snowmobile can easily turn right and left because the flares receive reaction force from the snow while turning. Such a ski is disclosed in, for example, U.S. Pat. No. 4,491,333.

Snowmobile skies with the flares are useful for most snow conditions. These skies, however, do not function as well in softer snow such as freshly fallen/virgin snow. The skis often are buried under softer, powdery snow and the maneuverability of the snowmobile consequently is reduced.

SUMMARY OF THE INVENTION

A need therefore exists for an improved steering ski for a snowmobile. The ski should improve handling in a wide variety of snow conditions. Preferably, the ski would include a vertical section and/or a horizontal section, in addition to a primary section, that prevents the ski from being buried under almost all kind of soft snow and improves maneuverability of the snowmobile.

In accordance with one aspect of the present invention, a ski for a snow vehicle comprises a longitudinally extending primary section. The longitudinally extending primary section comprises a first generally horizontal surface. A forward portion of the first generally horizontal surface curls upward. A keel section extends downward along at least a portion of the primary section. At least one generally vertical section extends upward along at least a portion of the primary section. The generally vertical section comprises a generally vertical surface that is connected to the first generally horizontal surface.

In accordance with another aspect of the present invention, a snow vehicle comprises a body. A frame assembly supports the body. A ski is mounted to the frame assembly. The ski is steerable relative to the body. The ski comprises a longitudinally extending primary section. The primary section comprises a generally horizontally extending first surface. At least one generally vertical section extends upward from the primary section. The generally vertical section comprises a generally vertically extending second surface. The second surface extends upwardly from an outer lateral portion of the first surface.

In accordance with a further aspect of the present invention, an embodiment of the present invention comprises a ski for a snow vehicle. The ski comprises a generally longitudinally extending primary section. The primary section comprises a generally horizontally extending lower surface. A keel section extends downward from the lower surface. A first generally vertically extending side surface extends upward from the lower surface and a second generally vertically extending side surface extends upward from the lower surface. The lower surface is generally interposed between the first and second generally vertical surfaces. A first generally horizontal upper surface extends laterally outward from the first generally vertical surface and a second generally horizontal upper surface extends laterally outward from the second generally vertical surface. The first and second upper surfaces are disposed at an elevation higher than the bottom surface.

BRIEF DESCRIPTION OF THE DRAWINGS

The above and other features, aspects and advantages of the present invention will now be described with reference to drawings that show presently preferred arrangements that are intended to illustrate and not to limit the present invention and in which.

DETAILED DESCRIPTION OF THE PREFERRED EMBODIMENTS

Figure 1:
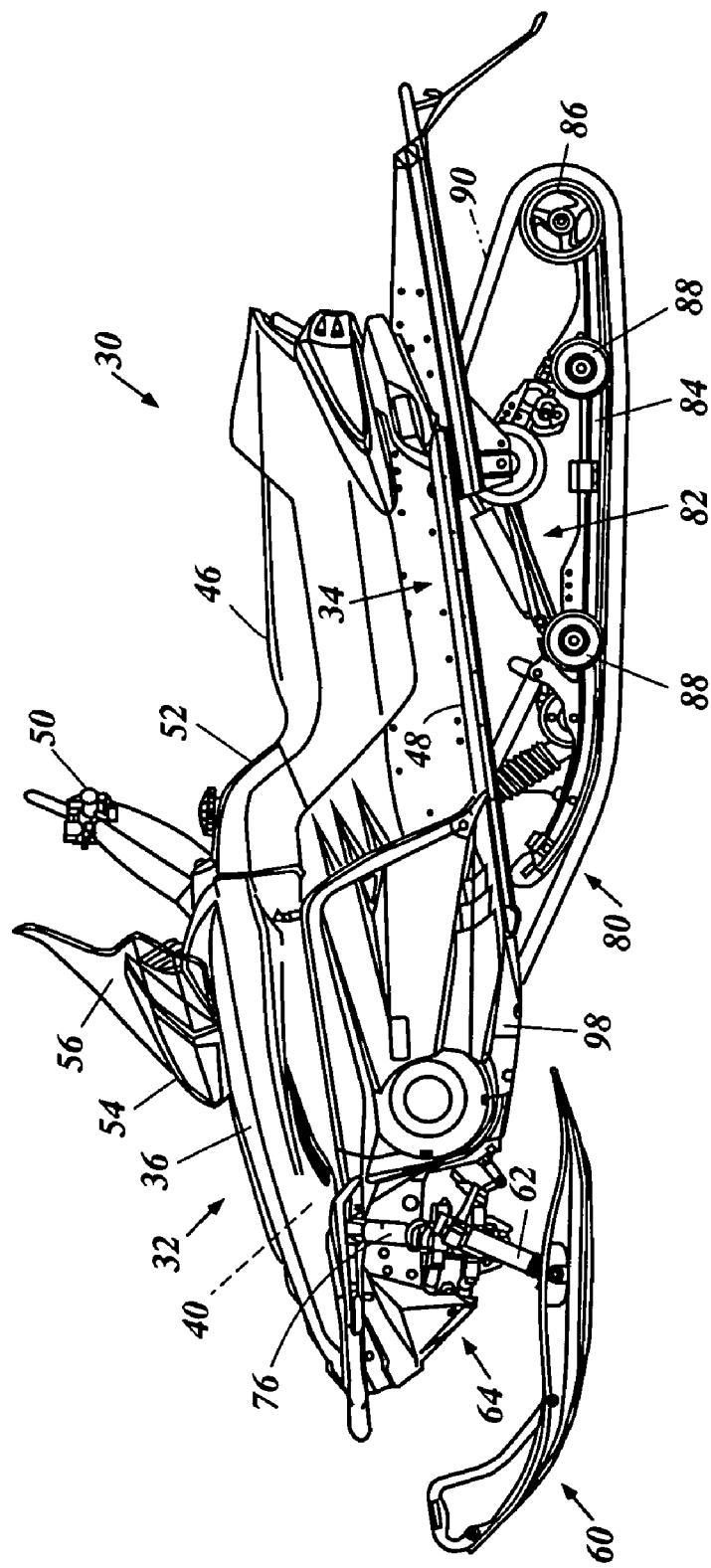
FIG. 1 is a side elevation view of a snowmobile having a pair of steering skis arranged and configured in accordance with certain features, aspects and advantages of the present invention.
Figure 2:
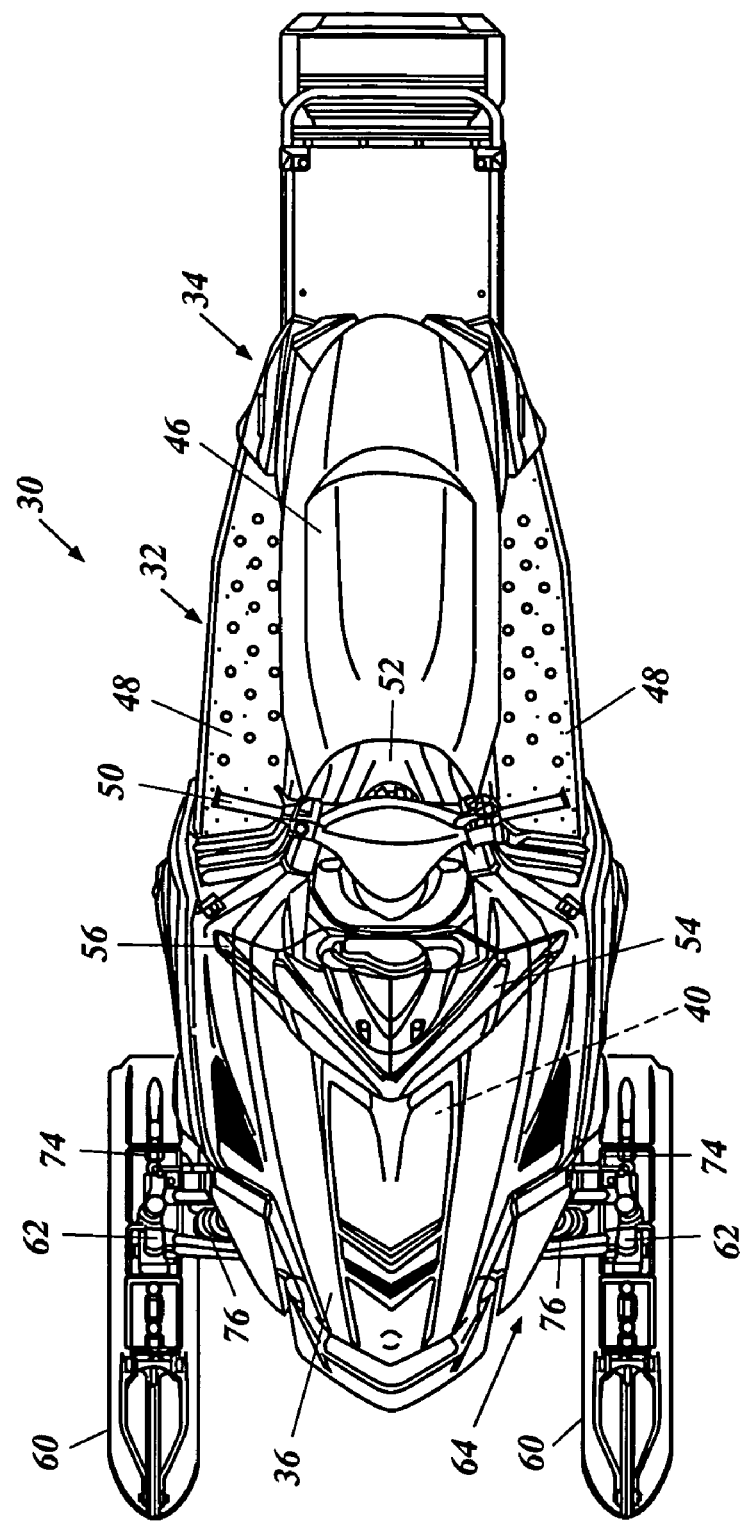
FIG. 2 is a top plan view of the snowmobile of FIG. 1.

With reference initially to FIGS. 1 and 2, a snowmobile having a pair of steering skis constructed in accordance with an embodiment of the present invention is identified generally by the reference numeral 30. While described in the context of a snowmobile, it should be readily appreciated that the present invention also can be used in a variety of other applications, such as all terrain vehicles having at least one front ski, for instance.

The snowmobile 30 includes a body assembly 32 made up of a number of parts which may be formed from suitable materials. The illustrated body assembly 32 includes a frame 34, an upper engine shroud 36, and a lower tray 38. The upper engine shroud 36 and the lower tray 38 are connected to the frame 34. Together the upper engine shroud 36 and the lower tray 38 define an engine compartment 40 that preferably houses an internal combustion engine (not shown) for powering the snowmobile 30.

In this description, the terms "forward," "forwardly" and "front" mean at or to the side where the engine is located, and the terms "rear," "rearward" and "backwardly" mean at or to the opposite side of the front side, unless indicated otherwise or otherwise readily apparent from the context use.

The illustrated body assembly 32 further includes a rear portion that accommodates a seat 46, which is adapted to seat one or more riders in a straddle fashion. The frame 34 has a pair of footrests 48 on both sides of the seat 46 such that feet of the riders can be placed thereon. A handlebar assembly 50 is positioned in front of the seat 46 and is used to control movement of the snowmobile 30. The handlebar assembly 50 preferably includes a throttle lever to control an output of the engine, a brake lever to stop the snowmobile 30 and at least one switch unit to start the engine. A fuel tank 52 is positioned generally between the handlebar assembly 50 and the seat 46.

The illustrated upper engine shroud 36 includes a raised portion 54 located in front of the handlebar assembly 50. The raised portion 54 carries a windshield 56.

Figure 3:
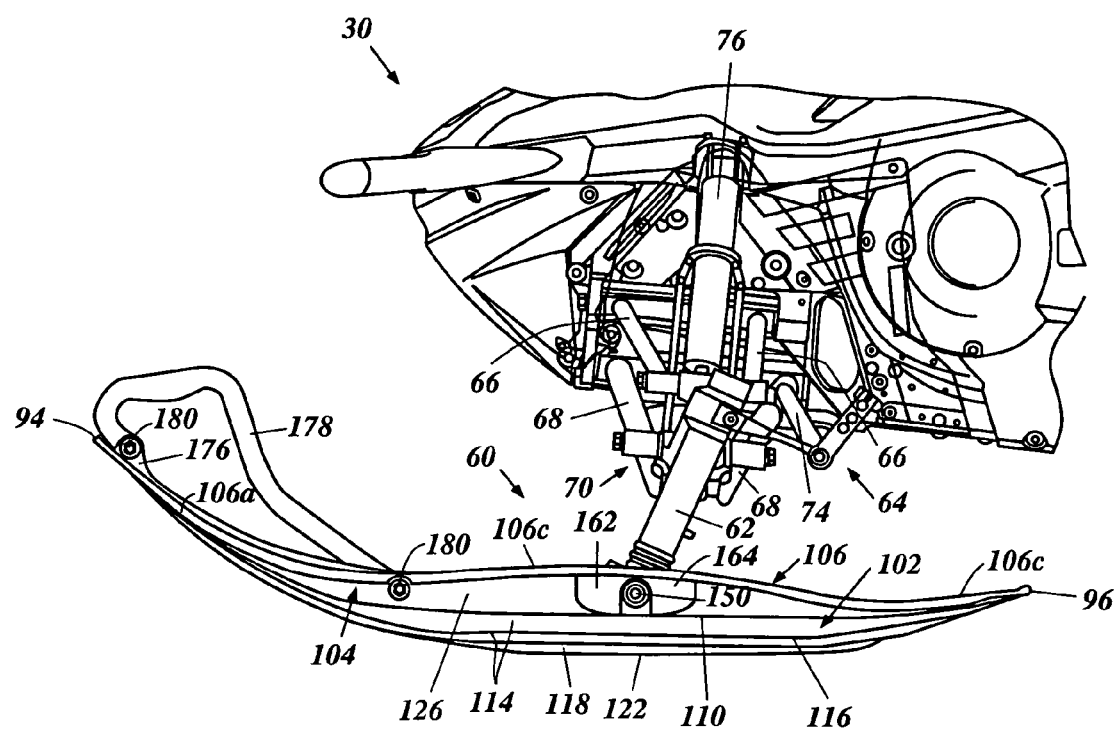
FIG. 3 is an enlarged partial side elevation view of the snowmobile of FIG. 1 showing one of the steering skies and a portion of a steering mechanism that operates the steering ski.
Figure 4:
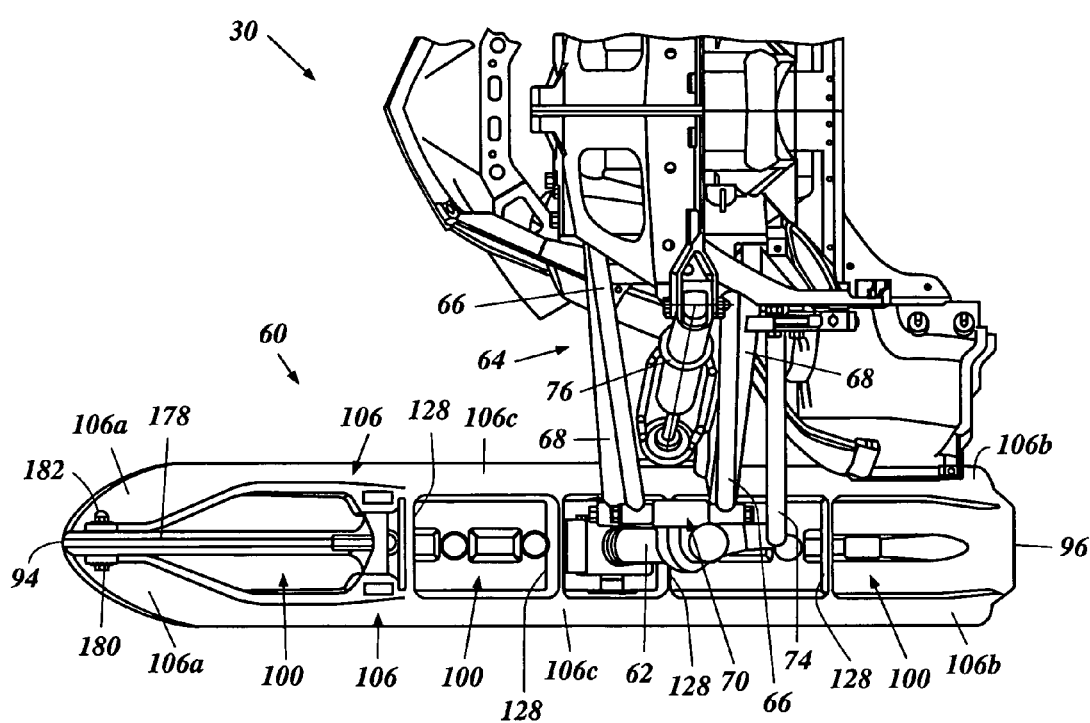
FIG. 4 is an enlarged partial top plan view of the snowmobile showing the steering ski and the portion of the steering mechanism of FIG. 3.

With particular reference to FIGS. 3 and 4, a pair of front skis 60 having a construction described below are supported at a forward portion of the body assembly 32 with a set of suspension struts 62. The skis 60 are positioned generally below the engine compartment 40. The suspension struts 62 are part of a steering mechanism 64 and accommodate steering movement of the skis 60. The struts 62 preferably are interconnected with tie rods so that they can be steered in unison. In the illustrated embodiment, right upper tie rods 66 and right lower tie rods 68 are pin joined to a right tie-rod bracket unit 70 that is connected to the right suspension strut 62. Similarly, left upper tie rods and left lower tie rods preferably are pin joined to a left tie-rod bracket unit that is connected to the left suspension strut 62.

The steering mechanism 64 preferably includes a steering linkage that comprises a steering column (not shown) and a pair of steering rods 74. One of the steering rods 74 is connected to a respective one of the suspension struts 62. The handlebar assembly 50 is linked to the skis 60 through the steering column and the steering rods 74 such that movement of the handlebar assembly 50 results in a corresponding steering movement of the skis 60, as is known in the art. Each of the skis 60 is also suspended relative to the frame 34 by a shock absorber 76.

With reference back to FIG. 1, a carriage assembly 80 preferably is supported at the rear portion of the body 32 below the seat 46 by a suspension system 82. The carriage assembly 80 includes a pair of guide rails 84 that carry a main rear idler roller 86 and other idler rollers 88.

The guide rails 84 and the idler rollers 86, 88 preferably cooperate to form a path around which a drive track 90 is trained. The drive track 90 is driven by an output shaft (not shown) of the engine through a suitable variable belt-type transmission (not shown) to propel the snowmobile 30 forwardly or backwardly along the terrain, as is well known in the art.

The drive track 90 preferably is suspended relative to the body 32 by means of a front suspension and a rear suspension together forming the suspension system 82. The front and rear suspensions are connected to the guide rails 84 which back up the drive track 90. The front suspension preferably includes a link rod and a tubular shock absorber. The link rod and the shock absorber extend between the guide rails 84 and the frame 34. The rear suspension preferably includes a control rod and a tubular shock absorber. The front and rear suspensions of the snowmobile 30 operate in a known manner.

With reference to FIGS. 5–11, a structure of the ski 60 and a coupling construction between the ski 60 and the suspension strut 62 is described below. As discussed above, the snowmobile 30 has two skis 60. Because both of the skis 60 have the same structure, the ski 60 on the left hand side represents both of the skis 60 throughout this description unless indicated otherwise or otherwise readily apparent from the disclosure.

In general, the ski 60 preferably is an elongated plate extending generally fore to rear along a longitudinal axis of the snowmobile 30 when the steering mechanism 64 is not operated and stays in an initial position or neutral position. The ski 60 has a front end 94 and a rear end 96. The illustrated ski 60 is made of a plastic material. Other materials such as, for example but without limitation, a sheet metal can be used.

The ski 60 preferably comprises an elongated primary section 100, a keel section 102, a pair of generally vertical or side sections 104 and a pair of generally horizontal or wing-like sections 106. Preferably, the ski 60 is generally symmetrical relative to a central vertical plane CP, which extends longitudinally and vertically, as shown in FIGS. 8–11. The central plane CP preferably intersects the keel section 102. In one embodiment, all of the sections 100, 102, 104, 106 can be formed unitarily in an injection process, a casting process or any other conventional processes of plastic materials.

As used in this description, the term "vertical" and "vertically" mean that portions, members or components extend generally in the direction of gravity. The term "horizontal" and "horizontally" in turn mean that portions, members or components extend generally normal to those that extend vertically. Also, the terms "horizontal" and "horizontally" should be construed in the broad sense of the language. For example, in the illustrated embodiment, the front and rear portions of the ski 60 warp upward as discussed below. In this description, the front and rear portions still extend "horizontally" in the broad sense.

The primary section 100 is a base or body of the ski 60 that extends generally fore to rear. The primary section 100 preferably has a bottom surface 110, a intermediate portion of which normally contacts snow. The bottom surface 110 extends generally horizontally. The illustrated primary section 100 warps upward proximate the front end 94 and also warps upward proximate the rear end 96. The radius of curvature of the front portion preferably is greater than the radius of curvature of the rear portion. Also, the length of the curved front portion preferably is longer than the length of the rear curved portion. In the illustrated embodiment, the front portion becomes narrower toward the front end 94, while the rear portion extends generally linearly almost to the rear end 96.

The keel section 102 projects downward from the primary section 100. The keel section 102 extends along the primary section 100 fore to rear, and thus forward and rear portions of the illustrated keel section 102 preferably warp upward. The keel section 102 preferably extends substantially the entire distance between the front and rear ends 94, 96. The keel section 102 also preferably divides the lateral dimension of the bottom surface 110 into two surfaces. Desirably, the divided surfaces merge together at front and rear locations close to the front and rear ends 94, 96.

The illustrated keel section 102 has a generally horizontal bottom surface 112 and generally vertical side surfaces 114. The generally horizontal surface 112 extends generally horizontally at a lower elevation than the bottom surface 110 of the primary section 100. The generally vertical surfaces 114 extend generally vertically but are shaped such that the keel section 102 is slightly tapered downward. The generally vertical surfaces 114 connect the generally horizontal surface 112 of the keel section 102 to the bottom surface 110 of the primary section 100. In the illustrated embodiment, a lower portion of the vertical surfaces 114 (i.e., below a line 116) is generally straight downward rather than being tapered. Preferably, a portion of the keel section 102 located in a center area of the ski 60 in the longitudinal direction is larger than other portions of the keel section 102. The keel section 102, particularly, the vertical surfaces 114, reduce the likelihood of lateral skidding of the ski 60.

Figure 10:
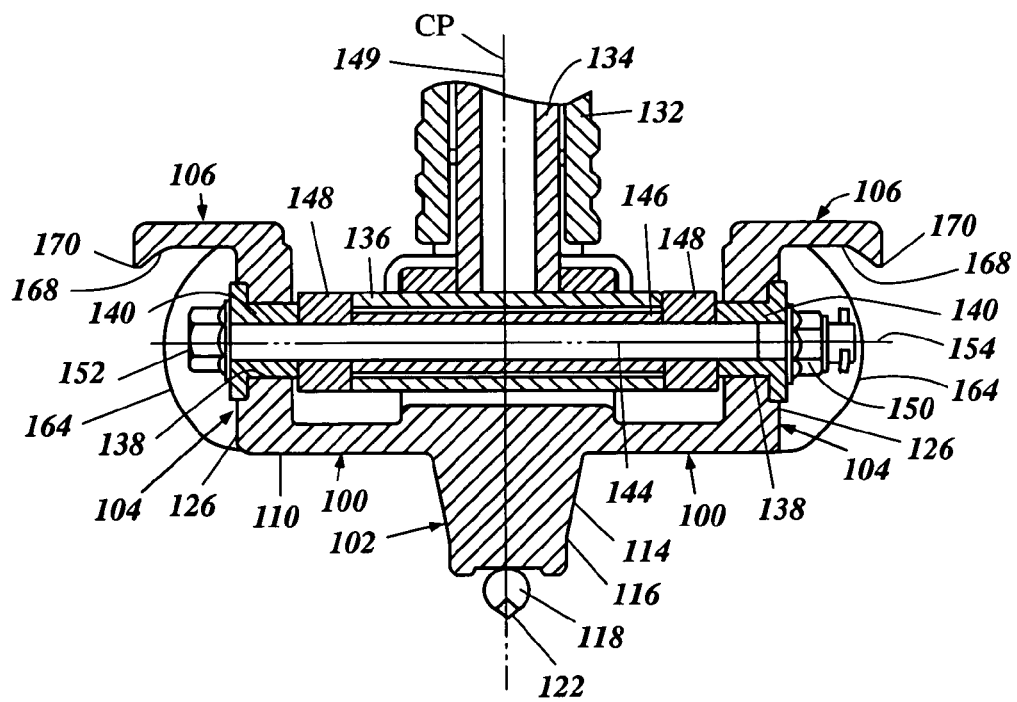
FIG. 10 is a cross-sectional view of the ski taken along the line 10—10 of FIG. 7.
Figure 11:
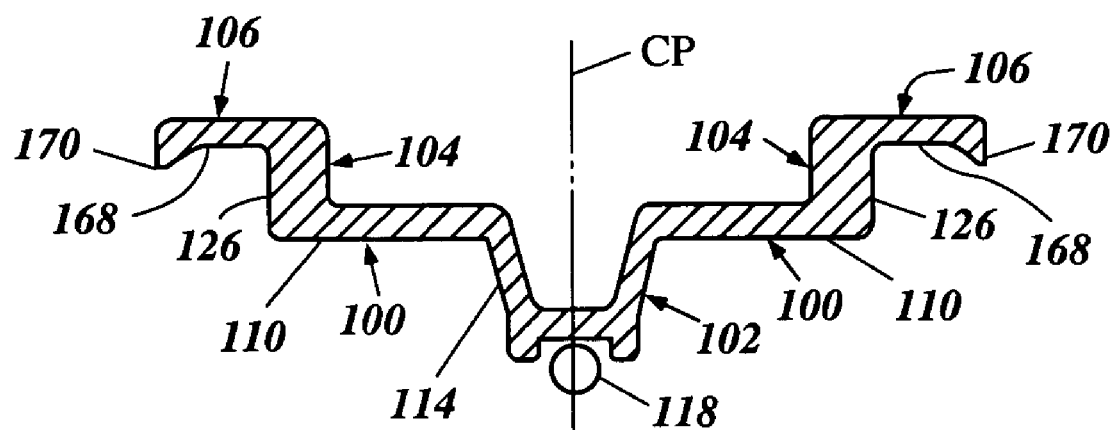
FIG. 11 is a cross-sectional view of the ski taken along the line 11—11 of FIG. 7.

In the illustrated embodiment, a wear bar 118 depends from the keel section 102 and desirably comprises the lowest surface of the ski 60. The wear bar 118 preferably extends generally along the center portion of the keel section 102 in a generally linear portion of the keel section 102 (i.e., in the area of the foregoing intermediate portion of the primary section 100). In the illustrated embodiment, the wear bar 118 has a plurality of stud bolts (not shown) that are spaced apart from each other in the longitudinal direction. The keel section 102 has a plurality of apertures (not shown) formed along the generally horizontal surface 112 that correspond to the stud bolts at a bottom wall thereof. The stud bolts of the wear bar 118 extend upward through the apertures. Nuts are screwed onto the bolts to removably fix the wear bar 118 to the keel section 102. As is known, the wear bar 118 reduces the wear of the other components of the steering ski 60 and thereby extends the life of the ski 60. Thus, the wear bar 118 is preferably made of a tough material, such as a hard metal material, e.g. steel. Furthermore, in the illustrated embodiment, a super hard chip such as, for example, a cemented carbide chip 122 is press-fitted to the bottom of the wear bar 118 in its center portion as best shown in FIGS. 5 and 10.

The generally vertical sections 104 preferably extend along the primary section 100 fore to rear and oppose each other. Each generally vertical section 104 has a generally vertical surface 126 that extends generally vertically from a side edge of the bottom surface 110 of the primary section 100. The illustrated generally vertical surfaces 126 extend substantially normal to the bottom surface 110 of the primary section 100. In other words, the generally vertical sections 104 extend substantially parallel to the central generally vertical plane CP. In some alternatives, the generally vertical sections 104 may slightly incline outward. That is, the generally vertical surfaces 126 can extend at an angle less than about 120° relative to the bottom surface 110 of the primary section 100 (i.e., less than about 30° relative to the center generally vertical plane CP.). Also, the angles of the inclination of the generally vertical surfaces 126 can differ from each other. For example, one angle can be about 90°, while the other can be about 120°. The generally vertical sections 104 can reinforce the ski 60. In the illustrated embodiment, a plurality of transverse walls 128 extends between the vertical sections 104 to further reinforce the ski 60.

The suspension strut 62 preferably is coupled to the generally vertical sections 104. The suspension strut 62 includes an outer cylinder 132 and an inner cylinder 134 that are coaxially disposed. The inner cylinder 134 is movable within the outer cylinder 132. As best shown in FIGS. 5 and 10, the inner cylinder 134 is coupled with a transverse tubular member 136. Preferably, the inner cylinder 134 is welded to the tubular member 136. The respective generally vertical sections 104 have apertures 138 at about the same elevation as one another from the bottom surface 110 of the primary section 100. A collar 140 preferably is fitted into each aperture 138. A support shaft supports the tubular member 136 on the generally vertical sections 104. In the illustrated embodiment, the support shaft is a long bolt 144. The illustrated bolt 144 is longer than a distance between both of the vertical surfaces 126 and extends through the collars 140 and the tubular member 136. Preferably, another collar 146 is inserted between the tubular member 136 and the bolt 144. Also, spacers 148 are disposed between the tubular member 136 and the respective generally vertical sections 104 to position an axis 149 of the strut 62 on the central generally vertical plane CP. A nut 150 is screwed onto the bolt 144 at the location opposite to the head 152 of the bolt 144. The ski 60 preferably is pivotable about an axis 154 defined by the support shaft, i.e., the bolt 144.

Figure 5:
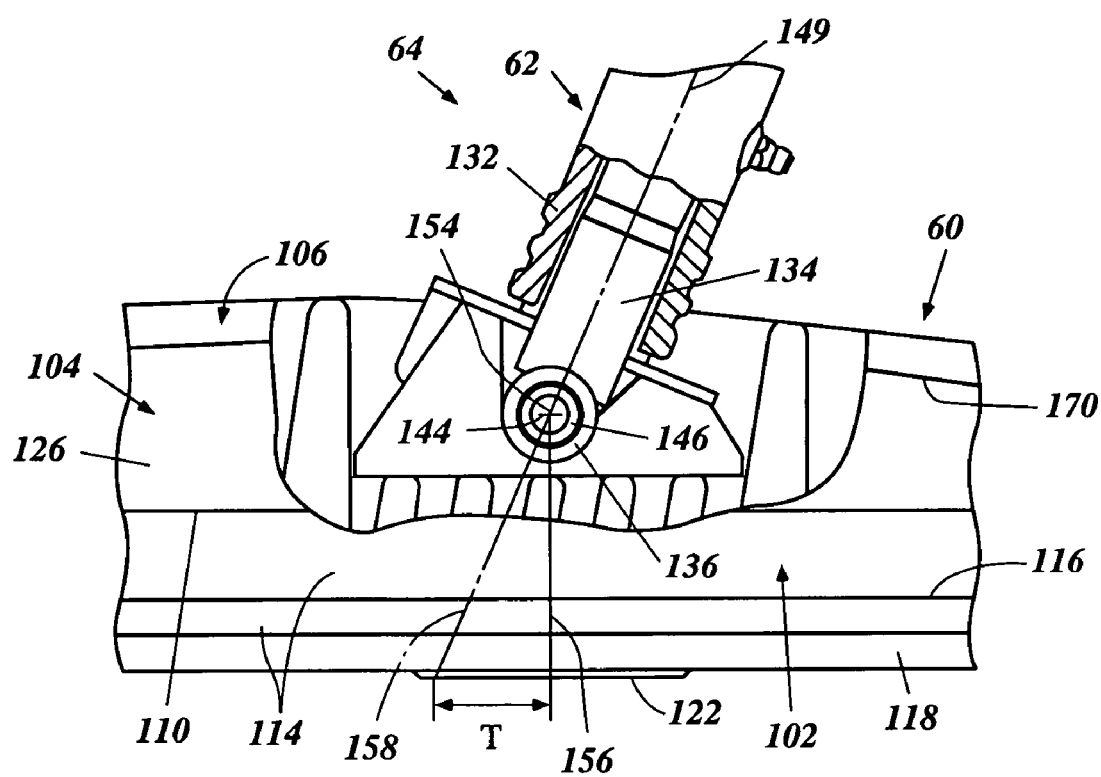
FIG. 5 is a further enlarged partial side view of the ski showing a coupling structure with a suspension strut of the steering mechanism.
Figure 6:
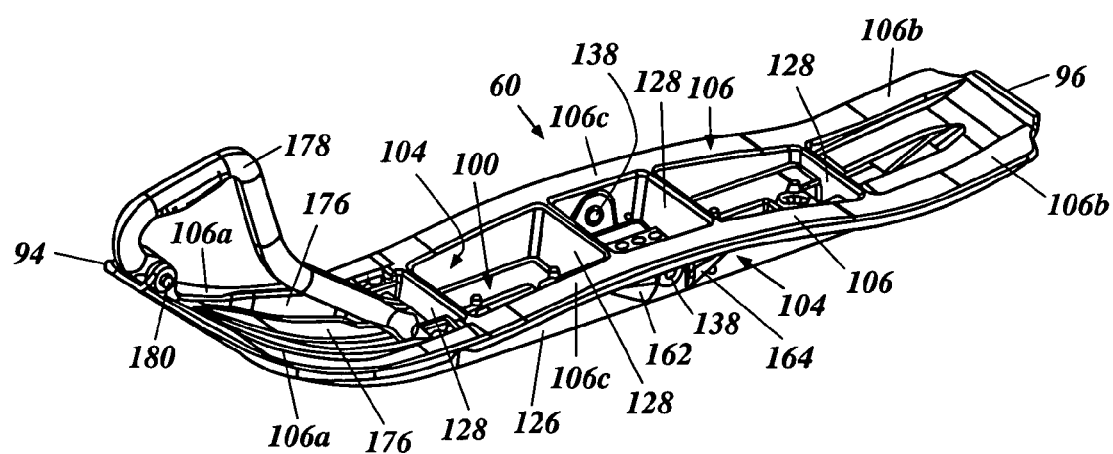
FIG. 6 is a perspective view of the ski shown in FIG. 1 as removed from the snowmobile.

As best shown in FIG. 5, the axis 149 of the suspension strut 62 inclines rearwardly and upwardly to provide a desired travel amount T, which is a distance between a point at which a perpendicular line 156 extending from the axis 154 of the bolt 144 intersects the bottom surface of the ski 60 (i.e., the bottom of the chip 122 in this embodiment) and a point at which an extended line 158 of the strut axis 149 intersects the bottom surface of the ski 60. The desired travel amount T can provide good stability to the snowmobile 30 in every running state thereof.

The head 152 of the bolt 144 projects outward beyond the generally vertical surface 126 of the generally vertical section 104. The other end of the bolt 144 also projects outward beyond the other generally vertical surface 126 of the generally vertical section 104. In order to protect the bolt 144 and the nut 150, each generally vertical section 104 preferably has a front protrusion 162 and a rear protrusion 164. The front protrusion 162 extends outward from the generally vertical surface 126 closely in front of the head 152 of the bolt 144 or the nut 150. Similarly, the rear protrusion 164 extends outward from the generally vertical surface 126 closely in the rear of the head 152 of the bolt 144 or the nut 150. The front and rear protrusions 162, 164 preferably are configured to gradually become larger toward the axis 154 of the bolt 144 and to have a sheer surface toward the axis 154. Also, the front and rear protrusions 162, 164 preferably are generally symmetrical relative to a generally vertical plane including the axis 154. The front and rear protrusions 162, 164 can protect the bolt 144, the nut 150 and other members positioned around them, if any, from foreign materials such as, for example, stones or rocks while the snowmobile 30 proceeds forwardly or backwardly. In one variation, the rear protrusion 164 can be omitted because a risk such that the bolt 144, nut 150 and other members might be damaged by foreign materials is substantially decreased when the snowmobile 30 moves in reverse.

The generally horizontal sections 106 preferably extend along the primary section 100 fore to rear. Each generally horizontal section 106 has a generally horizontal bottom surface 168 that extends generally horizontally outward (i.e., opposite to the bottom surface 110 of the primary section 100 relative to the center vertical plane CP) and substantially from a top end of the generally vertical surface 126 of the generally vertical section 104.

Figure 7:
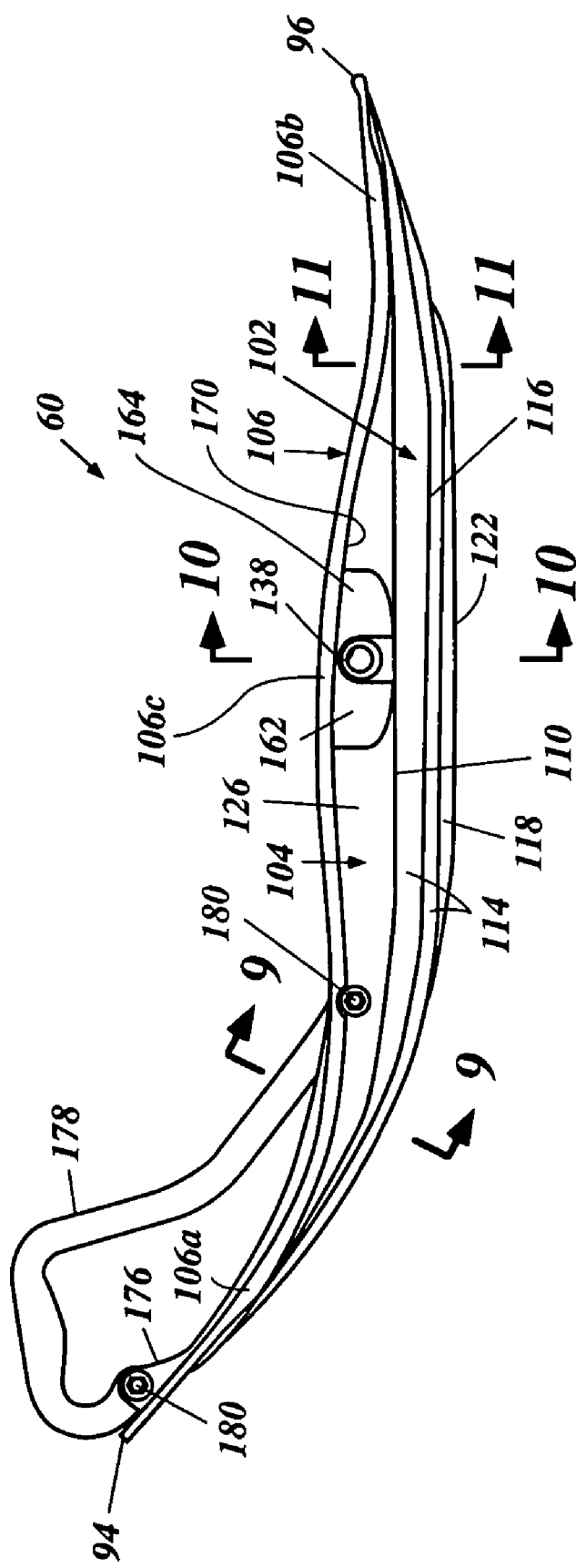
FIG. 7 is a side elevation view of the ski of FIG. 6.
Figure 8:
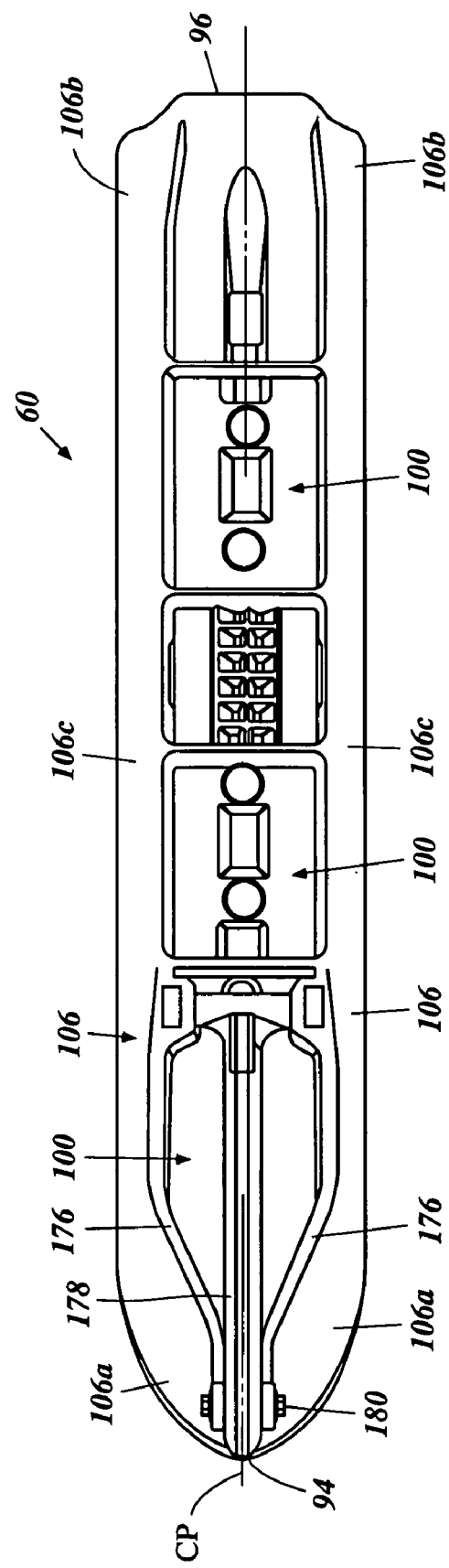
FIG. 8 is a top plan view of the ski of FIG. 6.
Figure 9:
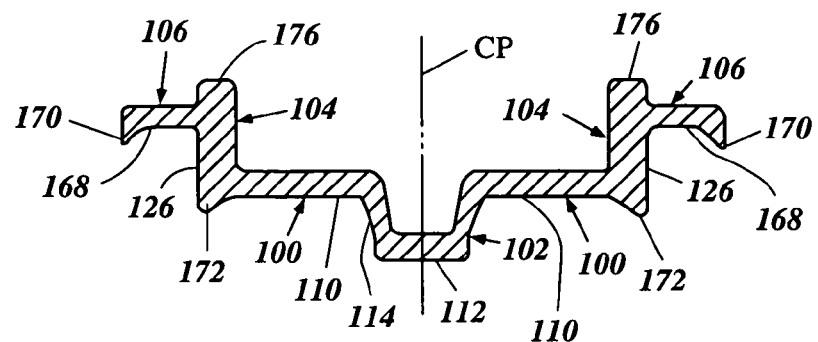
FIG. 9 is a cross-sectional view of the ski taken along the line 9—9 of FIG. 7.

A forward portion 106*a* and a rear portion 106*b* of each generally horizontal section 106 are bowed along with the front and rear portions of the primary section 100. A center portion 106*c* of each horizontal section 106 in the longitudinal direction preferably curls upward relative to a center portion of the bottom surface 110 of the primary section 100. As shown in FIG. 7, the center portion 106*c* preferably is positioned lower than the front end 94 and higher than the rear end 96. Thus, the generally horizontal sections 106 wave up and down. In one alternative, however, the generally horizontal sections 106 can have a smoothed contour that does not undulate in that manner shown in FIG. 7.

Along at least a portion of its length, each generally horizontal section 106 preferably has a snow entrapping portion 170 projected downward substantially from an outer end of the generally horizontal section 106. The snow entrapping portion 170 entraps snow under the bottom surface 168 of the generally horizontal section 106 and inhibits the snow from slipping away. In the illustrated embodiment, a similar snow entrapping portion 172 is formed at each corner where the generally vertical section 104 meets the primary section 100 in at least an area of the front portion of the ski 60.

Respective forward portions 176 of the generally vertical sections 104 preferably extend upward beyond top surfaces of the generally horizontal sections 106 and are tapered toward the front end 94 to merge together with the generally horizontal sections 106. A handgrip 178 preferably is affixed to the forward portions 176 of the generally vertical sections 104 by proper fixing members such as, for example, bolts 180 and nuts 182. Each forward portion 176 of the generally vertical section 104 has apertures, at front and rear ends thereof, through which the bolts 180 pass. The handgrip 178 thus is positioned in the forward-most portion of the ski 60. The handgrip 178 allows the rider to pull the snowmobile 30 by the skis 60 or to manually reposition the skis 60 when the snowmobile 30 is not being operated.

With reference to FIGS. 1–11, the rider operates the switch unit of the handlebar assembly 50 to start the engine. Then, the rider controls the throttle lever and steers the skies 60 by the handlebar 50 to move the snowmobile 30 forwardly or rearwardly on the ground covered with snow. Normally, the skis 60 always contact the snow with at least the intermediate portion of the bottom surface 110 of the primary section 100. The keel section 102 corresponding to the intermediate portion of the primary section 100 and the wear bar 118 are likely to continuously contact the snow. Whether the vertical surfaces 126 of the vertical sections 104 and/or the horizontal bottom surfaces 168 of the horizontal sections 106 contact the snow depends on snow conditions. It should be noted that, in the following description, portions of the respective sections 100, 102, 104, 106 that contact with snow are proximate the intermediate portion of the primary section 100 and the corresponding portions of the other sections 102, 104, 106.

If the snow is relatively hard, the bottom surface 110 of the primary section 100 and surfaces 112, 114 of the keel section 102 generally contact the hard snow. Those surfaces 110, 112, 114 can receive sufficient reaction force from the snow. The snowmobile 30 thus can have stable running conditions both when proceeding straight or turning right or left. Also, the snow entrapping portions 170 help the bottom surface 110 of the primary section 100 capture snow thereunder, which further improves steering.

If the snow is shallow and relatively soft, the skis 60 can be buried halfway under the snow. That is, at least some part of the generally vertical surfaces 126 of the generally vertical sections 104 is likely to be below a top surface of the snow. The part of the generally vertical surfaces 126 abutting the snow receive reaction force from the snow in addition to the reaction force created at the generally vertical surfaces 114 of the keel section 102. The snowmobile 30 thus maintains good stability in straight forward operation and when turning right and left.

If the snow is deep and relatively soft, the skis 60 are almost entirely buried under the snow and the generally horizontal bottom surfaces 168 of the generally horizontal sections 106 contact the snow. The skis 60, however, do not pass through the entire depth of the snow and the top surfaces of the generally horizontal sections 106 are exposed out of the snow. This is because the bottom surface 110 of the primary section 100 and the generally horizontal bottom surfaces 168 of the horizontal sections 106 together effectively float the skis 60 over the snow due to the reaction force created at the primary section 100 and the generally horizontal sections 106. Also, the snow entrapping portions 170 contribute to the ability of the primary section 100 and the generally horizontal sections 106 to entrap snow thereunder. Moreover, the center portions 106*c* of the generally horizontal sections 106 that curl upward can pass snow back under the ski when the snowmobile 30 proceeds forward. The snowmobile 30 thus can be operated straight ahead while making easy turns even under such deep snow conditions.

Advantageously, the wear bar 118 and the super hard chip 120 can reduce the likelihood that hard ice or hard foreign materials will damage the plastic portion of the skis 60. The front and rear protrusions 162, 164 also can subsstantially inhibit such hard ice or foreign materials from damaging the bolt 144 and the nut 126.

As thus described, the skis 60 in the illustrated embodiment can improve handling in a wide variety of snow conditions. Particularly, the skis 60 can provide good maneuverability under most conditions, such that the snowmobile 30 can track straight forward and that the snowmobile 30 can easily turn right and left.

Also, in the illustrated embodiment, the heights of the generally vertical sections 104 can vary without changing the travel T of the steering mechanism 64 because the support shaft, i.e., the bolt 144, is journaled on the generally vertical sections 104. In one variation, stays can be provided on the respective generally horizontal sections 106 to journal the support shaft. In this construction, however, the travel T can vary if the height of the genearlly vertical sections 104 is changed because the support shaft will likely be moved upward or downward together with the height of the generally vertical section.

Figure 12:
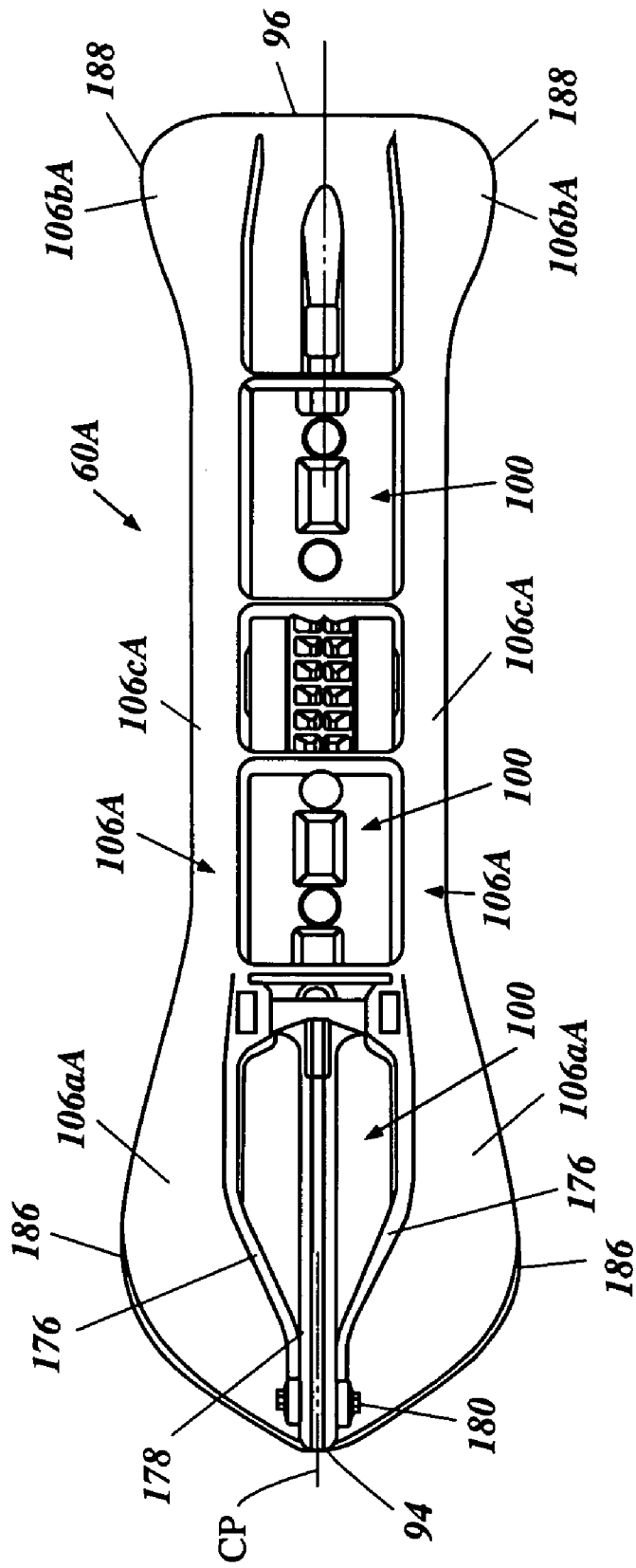
FIG. 12 is a top plan view of a modified ski configured in accordance with certain features, aspects and advantages of the present invention.

With reference to FIG. 12, a modified steering ski 60A configured in accordance with certain features, aspects and advantages of the present invention is described below. The same sections, portions and parts and the same members those which have been already described above will be assigned with the same reference numerals and will not be described repeatedly.

The ski 60A has generally horizontal sections 106A that are similar to the generally horizontal section 106 described above. Each generally horizontal section 106A preferably has a front portion 106*a*A and a rear portion 106*b*A, both of which are widened. That is, the front and rear portions 106aA, 106bA are expanded in the transverse direction of the ski 60A. In the illustrated embodiment, the front portions 106aA are larger than the rear portions 106bA. Each front portion 106aA has a wider portion 186, while each rear portion 106bA has a wider portion 188. The wider portion 186 of the front portion 106aA extends outward further than the wider portion 188 of the rear portion 106bA. The front wider portion 186 gradually becomes narrower and merges to form the front end 94. The rear wider portion 188 terminates more abruptly to form the rear end 96. The front wider portion 186 gradually becomes narrower and merges with the non-expanded outer edges of the center portions 106cA. Similarly, the rear wider portion 188 gradually tapers and merges with the non-expanded outer edges of the center portions 106cA.

The primary section 100 corresponding to the front and rear portions 106aA, 106bA of the generally horizontal sections 106A can be widened in the transverse direction together with the horizontal sections 106A. Preferably, the horizontal sections 106A are wider than the primary section 100. In some embodiments, only one of the generally horizontal sections 106A and the primary section 100 is widened.

The illustrated ski 60A is generally symmetrical relative to the longitudinal center plane CP. In one variation, a nonsymmetrical shape can be practicable. Either the front portions 106aA or the rear portions 106bA of the generally horizontal sections 106A can be linear in the center portions 106cA. Also, the horizontal sections 106 can be widened in any suitable configuration, as applicable. For example but without limitation, a wave configuration and a rectangular configuration can be used.

Such wider front and rear portions 106aA, 106bA increase the amount of snow captured thereunder. Thus, those portions 106aA, 106bA can increase the reaction force provided by the snow. As a result, the snowmobile having this type of skis 60A can have improved floating during straight tracking and improved maneuverability when turning right and left.

Although the present invention has been described in terms of certain preferred embodiments, other embodiments apparent to those of ordinary skill in the art also are within the scope of this invention. Thus, various changes and modifications may be made without departing from the spirit and scope of the invention. For instance, in some arrangements, the pair of vertical sections or the pair of horizontal sections are not necessarily provided, and one vertical section or one horizontal section can be sufficient. Moreover, not all of the features, aspects and advantages are necessarily required to practice the present invention. Accordingly, the scope of the present invention is intended to be defined only by the claims that follow.

What is claimed is:

1. A ski for a snow vehicle comprising a longitudinally extending primary section and a central generally vertical plane, said longitudinally extending primary section being generally symmetrical relative to said plane, said longitudinally extending primary section comprising a first generally horizontal surface, a forward portion of said first generally horizontal surface curling upward, a keel section extending downward along at least a portion of said primary section, and at least one generally vertical section extending upward along at least a portion of said primary section, said generally vertical section comprising a generally vertical surface that contacts the snow in use and that is connected to said first generally horizontal surface, the vertical surface including an aperture through which can extend a support member that couples the ski with a snow vehicle.

2. The ski as set forth in claim 1, wherein said generally vertical surface extends generally normal to said first generally horizontal surface.

3. The ski as set forth in claim 1, wherein said generally vertical surface extends at an angle less than about 120 degrees relative to said first generally horizontal surface.

4. The ski as set forth in claim 1 further comprising a generally horizontal section that extends outward from said generally vertical section, said horizontal section comprising a second generally horizontal surface that extends outward from a top end of said generally vertical surface, said second generally horizontal surface extending opposite to said first generally surface relative to said generally vertical surface.

5. The ski as set forth in claim 4, wherein a center portion of said second generally horizontal surface in the longitudinal direction curls upward relative to a center portion of said first generally horizontal surface in the longitudinal direction.

6. The ski as set forth in claim 4, wherein said second generally horizontal section comprises a downwardly extending lip that extends downward substantially from an outer end of said generally horizontal section.

7. The ski as set forth in claim 6, wherein said downwardly extending lip extends along a majority of said generally horizontal section.

8. The ski as set forth in claim 4, wherein either a lateral dimension of a forward portion of said first generally horizontal surface is larger than another lateral dimension of a more rearward portion of said first generally horizontal surface or a lateral dimension of a forward portion of said second generally horizontal surface is larger than a lateral dimension of a more rearward portion of said second generally horizontal surface.

9. The ski of claim 4, wherein the aperture is located at an elevation below the second generally horizontal surface.

10. The ski as set forth in claim 1, wherein a pair of said generally vertical sections is disposed opposite to each other with said primary section positioned generally between said generally vertical sections.

11. The ski as set forth in claim 1, wherein said primary section comprises a downwardly extending projected portion, said downwardly extending projected portion being connected to an outer lateral portion of said primary section.

12. The ski of claim 1, wherein a corresponding one of said pair of generally vertical sections comprises a protrusion that is disposed forward of said aperture to protect a tip portion of said support member projects laterally outward beyond a corresponding one of said pair of generally vertical sections.

13. The ski of claim 1, wherein the vertical surface is an outer surface of the ski.

14. The ski of claim 13, wherein when the ski is coupled with a snow vehicle, a vertical central longitudinal plane of the ski is disposed between the vertical surface and a vertical central longitudinal plane of the snow vehicle.

15. The ski of claim 1, wherein the aperture is located at an elevation below a top surface of the ski.

16. A snow vehicle comprising a body, a frame assembly supporting said body, a ski being coupled with a steering mechanism that includes a support shaft and that is mounted to said frame assembly, said ski being steerable relative to said body, said ski comprising a longitudinally extending primary section and a central generally vertical plane, said ski being generally symmetrical relative to said plane, said primary section comprising a generally horizontally extending first surface, at least one generally vertical section extending upward from said primary section, said generally vertical section comprising a generally vertically extending second surface, and said second surface extending upwardly from an outer lateral portion of said first surface, said second surface comprising an aperture through which the support shaft can extend, said second surface contacting the snow in use.

17. The snow vehicle as set forth in claim 16 further comprising a pair of said at least one generally vertical sections being disposed on opposing outer lateral portions of said first surface, each of said pair of generally vertical sections comprising a mounting portion including an aperture, said support shaft extending through said apertures.

18. The snow vehicle as set forth in claim 17, wherein at least one tip portion of said support shaft projects laterally outward beyond a corresponding one of said pair of generally vertical sections, and said corresponding one of said pair of generally vertical sections comprising a protrusion that is disposed proximate said mounting portion and forward of said at least one tip portion.

19. The snow vehicle as set forth in claim 18, wherein said one of the vertical sections comprises a second protrusion that is disposed proximate said mounting portion and rearward of said at least one tip portion.

20. A ski for a snow vehicle, the ski comprising a generally longitudinally extending primary section, said primary section comprising a generally horizontally extending lower surface, a keel section extending downward from said lower surface, a first generally vertically extending side surface for contacting the snow extending upward from said lower surface and a second generally vertically extending side surface for contacting the snow extending upward from said lower surface, said lower surface being generally interposed between said first and second generally vertical surfaces, at least one of said first and second vertically extending side surfaces comprising a mounting portion to which can be coupled a support member that is coupled with a steering mechanism, the at least one vertically extending side surface including a projection located forward of said support member for protecting said support member, a first generally horizontal upper surface extending laterally outward from said first generally vertical surface and a second generally horizontal upper surface extending laterally outward from said second generally vertical surface, and said first and second upper surface being disposed at an elevation higher than said bottom surface.

21. The ski of claim 20 further comprising a first lip extending downward from said first upper surface and a second lip extending downward from said second upper surface, said first and second upper surfaces being interposed between said first and second lips.

22. The ski of claim 20, wherein at least one of said first and second generally vertical surfaces is substantially normal to said bottom surface.

23. The ski of claim 20, wherein said first upper surface is substantially normal to said first generally vertical surface.

24. The ski of claim 20, wherein at least one of the first and second generally vertically extending side surfaces comprise an aperture located rearward of the projection through which the support member can extend.

25. The ski of claim 20, wherein the first generally horizontal upper surface and the second generally horizontal upper surface are disposed symmetrically about a central longitudinal plane of the ski.

26. A ski for a snow vehicle comprising a longitudinally extending primary section, said longitudinally extending primary section comprising a first generally horizontal surface, a forward portion of said first generally horizontal surface curling upward, a keel section extending downward along at least a portion of said primary section, and at least one generally vertical section extending upward along at least a portion of said primary section, said generally vertical section comprising a generally vertical surface that contacts the snow in use and that is connected to said first generally horizontal surface, the vertical surface including an aperture through which can extend a support member that couples the ski with a snow vehicle and a corresponding one of said pair of generally vertical sections comprises a protrusion that is disposed forward of said aperture to protect a tip portion of said support member projects laterally outward beyond a corresponding one of said pair of generally vertical sections.

27. A ski for a snow vehicle comprising a longitudinally extending primary section, said longitudinally extending primary section comprising a first generally horizontal surface, a forward portion of said first generally horizontal surface curling upward, a keel section extending downward along at least a portion of said primary section, and at least one generally vertical section extending upward along at least a portion of said primary section, said generally vertical section comprising a generally vertical surface that contacts the snow in use and that is connected to said first generally horizontal surface, the vertical surface including an aperture through which can extend a support member that couples the ski with a snow vehicle and the aperture being located at an elevation below a top surface of the ski.

* * * * *